United States Patent
Desai et al.

(10) Patent No.: US 9,344,623 B2
(45) Date of Patent: May 17, 2016

(54) METHODS AND SYSTEMS FOR PROVIDING FUNCTIONALITY OF AN INTERFACE TO CONTROL ORIENTATIONS OF A CAMERA ON A DEVICE

(71) Applicant: Google Inc., Mountain View, CA (US)

(72) Inventors: Munjal Desai, Mountain View, CA (US); Ryan Hickman, Mountain View, CA (US); Thor Lewis, Mountain View, CA (US); Damon Kohler, Mountain View, CA (US)

(73) Assignee: Google Inc., Mountain View, CA (US)

( * ) Notice: Subject to any disclaimer, the term of this patent is extended or adjusted under 35 U.S.C. 154(b) by 58 days.

(21) Appl. No.: 14/453,809

(22) Filed: Aug. 7, 2014

(65) Prior Publication Data

US 2014/0350727 A1 Nov. 27, 2014

Related U.S. Application Data

(63) Continuation of application No. 13/213,635, filed on Aug. 19, 2011, now Pat. No. 8,838,276.

(51) Int. Cl.
*H04N 5/232* (2006.01)
*B25J 9/16* (2006.01)

(52) U.S. Cl.
CPC .......... *H04N 5/23216* (2013.01); *B25J 9/1697* (2013.01); *H04N 5/23206* (2013.01); *G05B 2219/40002* (2013.01); *G05B 2219/40617* (2013.01); *Y10S 901/47* (2013.01); *Y10S 901/50* (2013.01)

(58) Field of Classification Search
CPC ................ B25J 9/1697; G05B 19/188; G05B 2219/40002; G05B 2219/40617; H04N 5/23206; H04N 5/23216; H04N 5/232; Y10S 901/47; Y10S 901/50
See application file for complete search history.

(56) References Cited

U.S. PATENT DOCUMENTS

| | | | | |
|---|---|---|---|---|
| 5,202,661 | A * | 4/1993 | Everett, Jr. ............. | G08B 13/00 340/522 |
| 6,115,037 | A | 9/2000 | Sumiyoshi et al. | |
| 2004/0027460 | A1 | 2/2004 | Morita | |
| 2004/0212484 | A1 | 10/2004 | Su et al. | |
| 2004/0254723 | A1 | 12/2004 | Tu | |

(Continued)

OTHER PUBLICATIONS

Berdan, "Creating Drag and Drop Objects that snap into Place—Make a Puzzle", FLASH MX tutorial, Nov. 9, 2002.
"Can we disable double right click(camera reset)", Lineage II Forums, May 2007.

(Continued)

*Primary Examiner* — Abby Lin
(74) *Attorney, Agent, or Firm* — McDonnell Boehnen Hulbert & Berghoff LLP

(57) ABSTRACT

Methods and systems for providing functionality of an interface to control orientations of a camera on a device are provided. In one example, a method includes receiving an input on an interface indicating a command for an orientation of a camera on a robotic device, and the interface may be provided on a device remote from the robotic device. An indicator may be provided on the interface representing a location of the input, and the indicator may be representative of the command for the orientation of the camera on the robotic device. The method may also include determining that the location of the input on the interface is within a distance threshold to a pre-set location on the interface, and repositioning the indicator on the interface to be at the pre-set location.

19 Claims, 6 Drawing Sheets

(56) References Cited

U.S. PATENT DOCUMENTS

| | | |
|---|---|---|
| 2006/0071915 A1 | 4/2006 | Rehm |
| 2006/0083506 A1 | 4/2006 | Kanayama |
| 2007/0183768 A1 | 8/2007 | Mottur et al. |
| 2011/0082643 A1 | 4/2011 | Huseth et al. |
| 2012/0176401 A1* | 7/2012 | Hayward .......... H04N 5/23216 345/619 |

OTHER PUBLICATIONS

Fletcher, iPhone It In: Final Fantasy I and II, Mar. 7, 2010.
Hodapp, 'Final Fantasy' and 'Final Fantasy II'—Excellent Ports of RPG Classics, toucharcade.com, Feb. 24, 2010.
Ascend4nt et al, CrossHairs(full-screen), Mar. 24, 2010.
Ponder, Review: SPB Puzzle, Windows Phone Central, May 14, 2009.

* cited by examiner

METHODS AND SYSTEMS FOR PROVIDING FUNCTIONALITY OF AN INTERFACE TO CONTROL ORIENTATIONS OF A CAMERA ON A DEVICE

CROSS-REFERENCE TO RELATED APPLICATIONS

This application is a continuation of U.S. patent application Ser. No. 13/213,635 filed on Aug. 19, 2011, the contents of which are hereby incorporated by reference.

BACKGROUND

In industrial design, a user interface provides functionality to enable interaction between humans and machines. A goal of interaction between a human and a machine at the user interface is generally effective operation and control of the machine, and feedback from the machine that aids the user in making operational decisions. Examples of user interfaces include interactive aspects of computer operating systems, hand tools, heavy machinery operator controls, process controls, etc.

Design considerations applicable when creating user interfaces may be related to or involve ergonomics and psychology. For example, user interfaces can be designed so as to be associated with the functionalities of a product, such as to enable intended uses of the product by users with efficiency, effectiveness, and satisfaction, taking into account requirements from context of use.

A user interface includes hardware and software components. User interfaces exist for various systems, and provide a manner to receive inputs allowing users to manipulate a system, and/or receive outputs allowing the system to indicate effects of the users' manipulation. Many types of user interfaces exist. One example user interface includes a graphical user interface (GUI) that is configured to accept inputs via devices such as a computer keyboard and mouse and provide graphical outputs on a display. Another example user interface includes touchscreens that include displays that accept input by touch of fingers or a stylus.

SUMMARY

This disclosure may disclose, inter alia, methods and systems for providing functionality of an interface to control orientations of a camera on a device.

In one example, a method is provided that comprises receiving an input on an interface indicating a command for an orientation of a camera on a robotic device. The interface may be provided on a device remote from the robotic device. The method also comprises providing an indicator on the interface representing a location of the input. The indicator may be representative of the command for the orientation of the camera on the robotic device. The method further comprises determining that the location of the input on the interface is within a distance threshold to a pre-set location on the interface, and repositioning the indicator on the interface to be at the pre-set location.

Any of the methods described herein may be provided in a form of instructions stored on a non-transitory, computer readable medium, that when executed by a computing device, cause the computing device to perform functions of the method. Further examples may also include articles of manufacture including tangible computer-readable media that have computer-readable instructions encoded thereon, and the instructions may comprise instructions to perform functions of the methods described herein.

The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage medium.

In one example, a non-transitory computer readable medium having stored thereon instructions executable by a computing device to cause the computing device to perform functions is provided. The functions comprise receiving an input on an interface indicating a command for an orientation of a camera on a robotic device, and providing an indicator on the interface representing a location of the input. The indicator may be representative of the command for the orientation of the camera on the robotic device. The functions may also comprise determining that the location of the input on the interface is within a distance threshold to a pre-set location on the interface, and repositioning the indicator on the interface to be at the pre-set location.

In addition, circuitry may be provided that is wired to perform logical functions in any processes or methods described herein.

In still further examples, any type of devices may be used or configured to perform logical functions in any processes or methods described herein.

In one example, a device is provided that comprises a processor, and memory including instructions stored therein executable by the processor to perform functions. The functions may comprise receiving an input on an interface indicating a command for an orientation of a camera on a robotic device, and providing an indicator on the interface representing a location of the input. The indicator may be representative of the command for the orientation of the camera on the robotic device. The functions may also comprise determining that the location of the input on the interface is within a distance threshold to a pre-set location on the interface, and repositioning the indicator on the interface to be at the pre-set location.

In yet further examples, any type of devices may be used or configured as means for performing functions of any of the methods described herein (or any portions of the methods described herein).

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

This disclosure may disclose, inter alia, methods and systems for providing functionality of an interface to control orientations of a camera on a device are provided. In one example, a method includes receiving an input on an interface indicating a command for an orientation of a camera on a robotic device, and the interface may be provided on a device remote from the robotic device. An indicator may be provided on the interface representing a location of the input, and the indicator may be representative of the command for the orientation of the camera on the robotic device. The method may also include determining that the location of the input on the interface is within a distance threshold to a pre-set location on the interface, and repositioning the indicator on the interface to be at the pre-set location.

Figure 1:
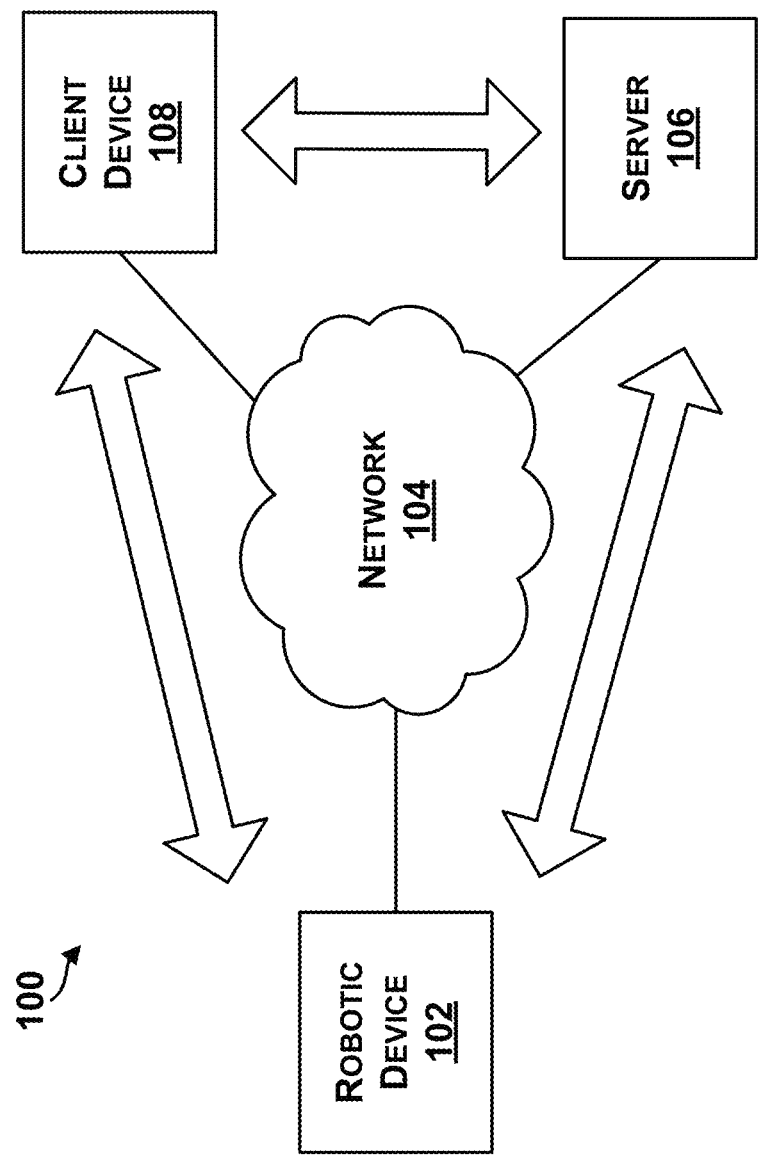
FIG. 1 is an example system for generating and modifying a view of a robotic device.

Referring now to the figures, FIG. 1 is an example system 100 for generating and modifying a view of a robotic device. The system 100 includes a robotic device 102 coupled to a network 104, and a server 106 and a client device 108 also coupled to the network 104. The robotic device 102 may further be coupled directly (or indirectly) to the server 106 and the client device 108 as shown. The system 100 may include more or fewer components, and each of the robotic device 102, the server 106, and the client device 108 may comprise multiple elements as well. Thus, one or more of the described functions of the system 100 may be divided up into additional functional or physical components, or combined into fewer functional or physical components. In some further examples, additional functional and/or physical components may be added to the examples illustrated by FIG. 1.

The system 100 may enable cloud-based computing. Cloud-based computing generally refers to networked computer architectures in which application execution and storage may be divided, to some extent, between client and server devices. A "cloud" may refer to a service or a group of services accessible over a network (e.g., Internet) by client and server devices, for example. Cloud-based computing can also refer to distributed computing architectures in which data and program logic for a cloud-based application are shared between one or more client devices and/or server devices on a near real-time basis. Parts of this data and program logic may be dynamically delivered, as needed or otherwise, to various clients accessing the cloud-based application. Details of the architecture may be transparent to users of client devices. Thus, a PC user or robot client device accessing a cloud-based application may not be aware that the PC or robot downloads program logic and/or data from the server devices, or that the PC or robot offloads processing or storage functions to the server devices, for example.

The system 100 includes a number of devices coupled to or configured to be capable of communicating with the network 104. Of course, more or fewer client devices may be coupled to the network 104. In addition, different types of devices may be coupled to the network 104. For example, any of the devices may generally comprise a display system, memory, and a processor.

Any of the devices shown in FIG. 1 may be coupled to the network 104 or to each other using wired or wireless communications. For example, communication links between the network 104 and devices may include wired connections, such as a serial or parallel bus. Communication links may also be wireless links, which may include Bluetooth, IEEE 802.11 (IEEE 802.11 may refer to IEEE 802.11-2007, IEEE 802.11n-2009, or any other IEEE 802.11 revision), or other wireless based communication links. In other examples, the system 100 may include access points through which the devices may communicate with the network 104. Access points may take various forms, for example, an access point may take the form of a wireless access point (WAP) or wireless router. As another example, if a client device connects using a cellular air-interface protocol, such as a CDMA or GSM protocol, an access point may be a base station in a cellular network that provides Internet connectivity via the cellular network.

As such, the robotic device 102, the server 106, and the client device 108 may include a wired or wireless network interface through which the devices can connect to the network 104 (or access points). As an example, the devices may be configured use one or more protocols such as 802.11, 802.16 (WiMAX), LTE, GSM, GPRS, CDMA, EV-DO, and/or HSPDA, among others. Furthermore, the client devices may be configured use multiple wired and/or wireless protocols, such as "3G" or "4G" data connectivity using a cellular communication protocol (e.g., CDMA, GSM, or WiMAX, as well as for "WiFi" connectivity using 802.11). Other examples are also possible.

The network 104 may represent a networked computer architecture, and in one example, the network 104 represents a queue for handling requests from client devices. The network 104 may further include any of a local area network (LAN), wide area network (WAN), wireless network (Wi-Fi), or Internet, for example.

The server 106 may be a component coupled to the network 104 (as shown), or a component of the network 106 depending on a configuration of the system 100. The server 106 may include a processor and memory including instructions executable by the processor to perform functions as described herein.

The client device 108 may include any type of computing device (e.g., PC, laptop computer, etc.), or any type of mobile computing device (e.g., laptop, mobile telephone, cellular telephone, etc.). The client device 108 may include a processor and memory including instructions executable by the processor to perform functions as described herein.

The robotic device 102 may comprise any computing device that may include connection abilities to the network 104 and that has an actuation capability (e.g., electromechanical capabilities). A robotic device may further be a combination of computing devices. In some examples, the robotic device 102 may collect data and upload the data to the network 104. The network 104 may be configured to perform calculations or analysis on the data and return processed data to the robotic device 102.

Any of the client devices may include additional components. For example, the robotic device 102 may include one or more sensors, such as a gyroscope, an accelerometer, or distance sensors to measure movement of the robotic device 102. Other sensors may further include any of Global Positioning System (GPS) receivers, infrared sensors, optical sensors, biosensors, Radio Frequency identification (RFID) systems, wireless sensors, and/or compasses, among others, for example.

In addition, any of the robotic device 102, the server 106, and the client device 108 may include an integrated user-interface (UI) that allows a user to interact with the device. For example, the robotic device 102 may include various buttons and/or a touchscreen interface that allow a user to provide input. As another example, the robotic device 102 may include a microphone configured to receive voice commands from a user. Furthermore, the robotic device 102 may include one or more interfaces that allow various types of user-interface devices to be connected to the robotic device 102.

Figure 2A:
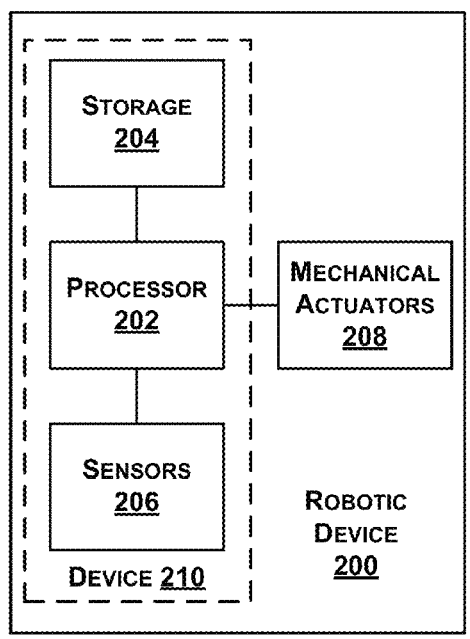
FIG. 2A-2C are example illustrations of robotic devices.

FIG. 2A illustrates an example robotic device 200. In one example, the robotic device 200 is configured as a robot. In some examples, a robot may contain computer hardware, such as a processor 202, memory or data storage 204, and one or more sensors 206. For example, a robot controller (e.g., processor 202, computing system, and sensors 206) may all be custom designed for a specific robot. The robot may have a link to access cloud servers (as shown in FIG. 1). A wired link may include, for example, a parallel bus or a serial bus such as a Universal Serial Bus (USB). A wireless link may include, for example, Bluetooth, IEEE 802.11, Cellular (such as GSM, CDMA, UMTS, EV-DO, WiMAX, or LTE), or Zigbee, among other possibilities.

In one example, the storage 204 may be used for compiling data from various sensors 206 of the robotic device 200 and storing program instructions. The processor 202 may be coupled to the storage 204 and may be configured to control the robotic device 200 based on the program instructions. The processor 202 may also be able to interpret data from the various sensors 206 on the robot. Example sensors may include a camera, smoke sensors, light sensors, radio sensors, infrared sensors, microphones, speakers, gyroscope, accelerometer, distance sensors, a camera, radar, capacitive sensors and touch sensors, etc. Example distance sensors include infrared ranging sensors, photoelectric distance sensors, proximity sensors, ultrasonic sensors, radar, or other types of sensors that may provide outputs used to determine a distance of the robotic device 200 to an object.

The robotic device 200 may also have components or devices that allow the robotic device 200 to interact with an environment (e.g., surrounding or ambient environment). For example, the robotic device 200 may have a camera to provide images of a field of view of the environment as well as mechanical actuators 208, such as motors, wheels, movable arms, etc., that enable the robotic device 200 to move or interact with the environment.

In some example, various sensors and devices on the robotic device 200 may be modules. Different modules may be added or removed from the robotic device 200 depending on requirements. For example, in a low power situation, a robot may have fewer modules to reduce power usages. However, additional sensors may be added as needed. To increase an amount of data a robot may be able to collect, additional sensors may be added, for example.

In some example, the robotic device 200 may be configured to receive a device, such as device 210, that includes the processor 202, the storage 204, and the sensors 206. For example, the robotic device 200 may be a robot that have a number of mechanical actuators (e.g., a movable base), and the robot may be configured to receive a mobile telephone to function as the "brains" or control components of the robot. The device 210 may be considered a module of the robot. The device 210 may be physically attached to the robot or in communication with the robot. For example, a mobile phone may sit on a robot's "chest" and form an interactive display. The device 210 may provide a robot with sensors, a wireless link, and processing capabilities, for example. The device 210 may allow a user to download new routines for his or her robot from the cloud. For example, a laundry folding routine may be stored on the cloud, and a user may be able to select this routine using a mobile phone to download the routine from the cloud, and when the mobile phone is placed into or coupled to the robot, the robot would be able to perform the downloaded action.

In some examples, the robotic device 200 may be coupled to a mobile or cellular telephone to provide additional sensing capabilities. The cellular phone may not be physically attached to the robot, but may be coupled to the robot wirelessly. For example, a low cost robot may omit a direct connection to the internet. This robot may be able to connect to a user's cellular phone via a wireless technology (e.g., Bluetooth) to be able to access the internet. The robot may be able to access various sensors and communication means of the cellular phone. The robot may not need as many sensors to be physically provided on the robot, however, the robot may be able to keep the same or similar functionality.

Thus, the robotic device 200 may include mechanical robot features, and may be configured to receive the device 210 (e.g., a mobile phone), which can provide additional peripheral components to the robotic device 200, such as any of an accelerometer, gyroscope, compass, GPS, camera, WiFi connection, a touch screen, etc., that are included within the device 210.

Figure 2B:
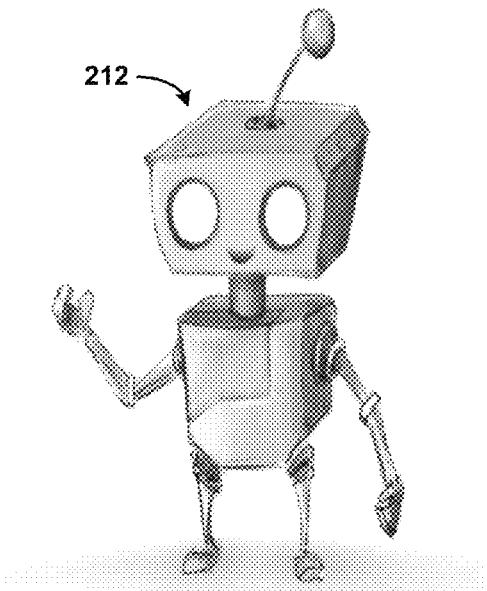

FIG. 2B illustrates a graphical example of a robot 212. In FIG. 2B, the robot 212 is shown as a mechanical form of a person including arms, legs, and a head. The robot 212 may be configured to receive any number of modules or components, such a mobile phone, which may be configured to operate the robot. In this example, a device (e.g., robot 212) can be attached to a mobile phone (e.g., device 210) to provide the mechanical robot 212 with functionality enabling the robot 212 to communicate with the cloud to cause operation/functions of the robot 212. Other types of devices that have connectivity to the Internet can be coupled to robot 212 to provide additional functions on the robot 212. Thus, the device 210 may be separate from the robot 212 and can be attached or coupled to the robot 212.

In one example, the robot 212 may be a toy with only limited mechanical functionality, and by connecting device 210 to the robot 212, the toy robot 212 may now be capable of performing a number of functions with the aid of the device 210 and/or the cloud. In this manner, the robot 212 (or components of a robot) can be attached to a mobile phone to transform the mobile phone into a robot (e.g., with legs/arms) that is connected to a server to cause operation/functions of the robot.

Figure 2C:
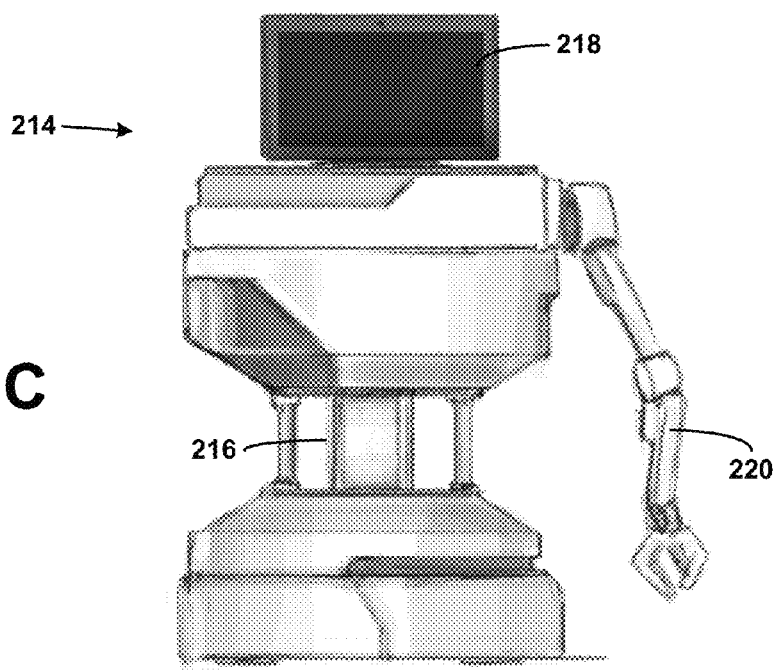

FIG. 2C illustrates another example of a robot 214. The robot 214 includes a computing device 216, sensors 218, and a mechanical actuator 220. In this example, the computing device 216 may be a laptop computer, which may be coupled to the sensors 218. The sensors 218 may include a camera, infrared projectors, and other motion sensing or vision sensing elements. The sensors 218 may be included within a tablet device, which may also function as the computing device 216.

The mechanical actuator 220 may include a base, wheels, and a motor upon which the computing device 216 and the sensors 218 can be positioned, for example.

Any of the robots illustrated in FIGS. 2A-2C may be configured to operate according to a robot operating system (e.g., an operating system designed for specific functions of the robot). A robot operating system may provide libraries and tools (e.g., hardware abstraction, device drivers, visualizers, message-passing, package management, etc.) to enable robot applications. Examples of robot operating systems include open source software such as ROS (robot operating system), DROS, or ARCOS (advanced robotics control operating system); proprietary software such as the robotic development platform ESRP from Evolution Robotics® and MRDS (Microsoft® Robotics Developer Studio), and other examples also include ROSJAVA. A robot operating system may include publish and subscribe functionality, and may also include functionality to control components of the robot, such as head tracking, base movement (e.g., velocity control, navigation framework), etc.

Any of the robots illustrated in FIGS. 2A-2C may be configured to operate according to example methods described herein, or according to instructions received from devices that may be configured to operate according to example methods described herein.

Figure 3:
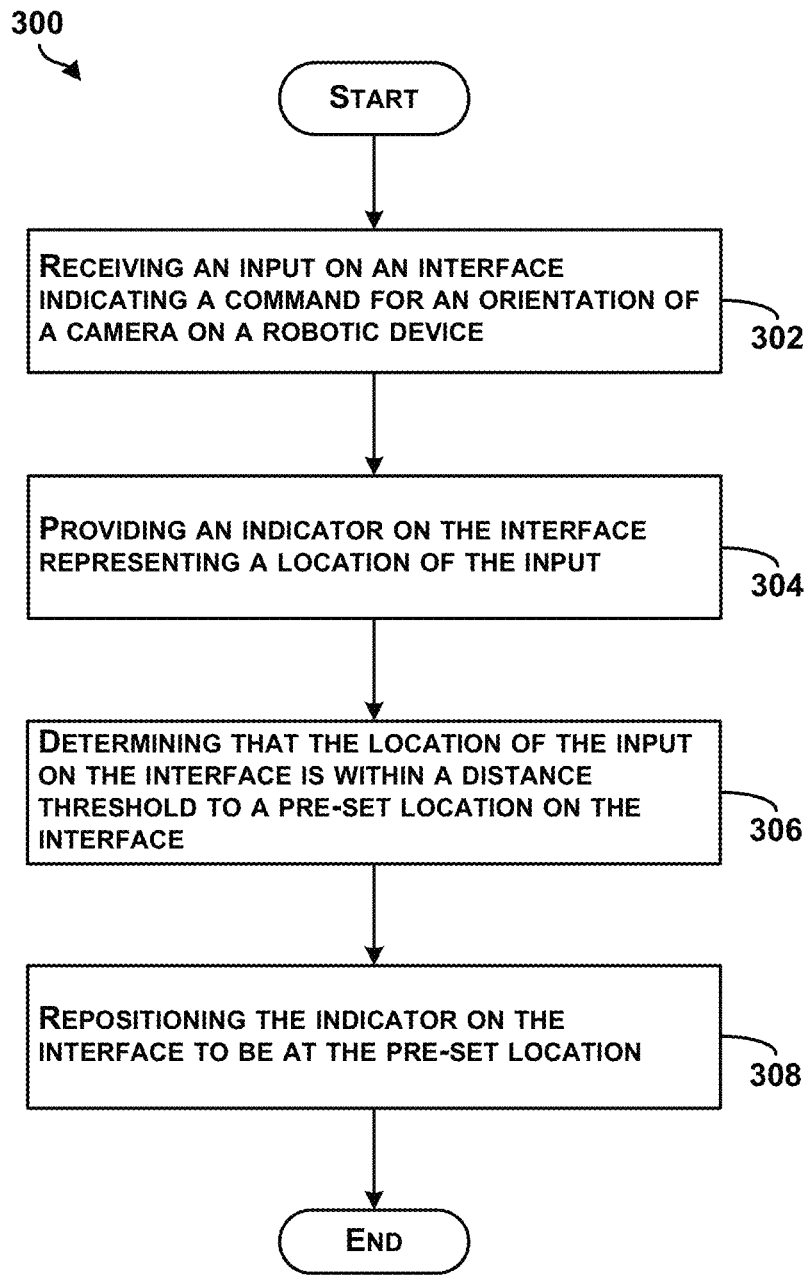
FIG. 3 is a block diagram of an example method of providing functionality of an interface to control orientations of a camera on a device.

FIG. 3 is a block diagram of an example method of providing functionality of an interface to control orientations of a camera on a device. Method 300 shown in FIG. 3 presents an embodiment of a method that, for example, could be used with the system 100, for example, and may be performed by a device, such as any devices illustrated in FIGS. 1-2, or components of the device. Method 300 may include one or more operations, functions, or actions as illustrated by one or more of blocks 302-308. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

In addition, for the method 300 and other processes and methods disclosed herein, the flowchart shows functionality and operation of one possible implementation of present embodiments. In this regard, each block may represent a module, a segment, or a portion of program code, which includes one or more instructions executable by a processor or computing device for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device.

In addition, for the method 300 and other processes and methods disclosed herein, each block in FIG. 3 may represent circuitry that is wired to perform the specific logical functions in the process.

At block 302, the method 300 includes receiving an input on an interface indicating a command for an orientation of a camera on a robotic device. In one example, the interface may be provided on a touchscreen display of a device, and the device may receive an input to the interface via a touch/contact to the touchscreen by a user or stylus. As another example, the interface may include a graphical user interface (GUI) of a device, and the device may receive an input to the interface via an input to a keyboard or mouse coupled to the device. As still another example, the interface may be a general interface to a device, and the device may receive an input via receiving a signal (via a wireless or wired connection) to the interface (e.g., which may take the form of a receiver, a port, etc.).

In some examples, the interface is provided on a device that is remote from the robotic device. The device may be operated to control the robotic device from a remote location.

In some examples, the interface may be provided on a display of a device overlaid on top of other information, such as map data, a display of applications running on the device, or a video stream of the camera. In one example, the device may receive the video stream of the camera, and provide the interface overlaid on top of the video stream on the display. The video stream may be provided in a background of the display, and the interface may be provided in a foreground of the display and illustrated as graphics on top of the video feed.

The interface may be configured to indicate or receive a command for an orientation of a camera on a robotic device. Thus, inputs to the interface may be associated with orientations of the camera on the robotic device including directional orientations used to control movement of the camera, and the interface may be configured to associate inputs with corresponding commands that can be used to control operation of the camera and/or the robotic device. The interface may thus take the form of an interface enabling a user to remote control the camera on the robotic device. In some examples, the camera on the robotic device may have a range of motion, and inputs received on the interface can be associated with commands for controlling motion of the camera.

The interface may be configured in a number of ways, and may include a shape configured to overlay an x-y axis. The x-axis can be configured to represent a pan value for the orientation of the camera on the robotic device and the y-axis can be configured to represent a tilt value for the orientation of the camera on the robotic device (other examples include opposite configurations). The command for the orientation of the camera on the robotic device can indicate a fixed orientation of the camera on the robotic device that includes a position of the camera with respect to the robotic device. For instance, the command may indicate to move the camera an amount in a horizontal or vertical direction with respect to a frame of reference of the robotic device (or to capture images, or to generate images with respect to a frame of reference of the robotic device).

Alternatively, the command may indicate a dynamic orientation of the camera on the robotic device that is associated with geographic position coordinates. In this example, the orientation of the camera may be configured with respect to a general frame of reference related to geographic position coordinates. For instance, the robotic device may be configured such that the camera is facing downward due to an orientation of the robotic device (e.g., the robotic device is tilting/leaning forward) and/or due to placement of the camera on the leaning robotic device (e.g., not due to orientation of the camera itself). The command may be indicative of an orientation of the camera taking into account the orientation of the robotic device by using geographic position coordinates.

In some examples, the command indicating panning or tilting of the camera may be performed by maintaining the camera stationary and digitally processing captured images so as to generate digitally processed images from a viewpoint of a camera in an orientation according to the pan/tilt values in the command.

At block 304, the method 300 includes providing an indicator on the interface representing a location of the input. For example, the indicator may be provided on the interface at or near the location of the input. In instances in which the interface is provided on a touchscreen, the indicator may be provided at a location surrounding or adjacent a location of the input. This may enable a user to view the indicator, since an indicator placed at the location of the input could be placed underneath a user's finger or stylus that provides contact with the touchscreen, and which may block or obstruct a view of an indicator placed at the location of the input. Alternatively, the indicator may be placed at the location of the input (such as underneath a user's finger on a touchscreen display).

The indicator may include a representation or may be representative of the command for the orientation of the camera on the robotic device. For example, based on a configuration of the interface, the indicator can be representative of the command, such as indicating to pan right/left, tilt up/down, etc.

In one example, the interface includes a rectangular shape configured to overlay an x-y axis, and the indicator is provided along a perimeter of the rectangular shape at a location substantially matching x-axis coordinates of the input on the interface. A second indicator may also be provided on the interface along the perimeter of the rectangular shape at a location substantially matching y-axis coordinates of the input on the interface. The indicators may be provided at locations that map to the location of the input. In further examples, a first group of indicators can be provided on the interface along a perimeter of the rectangular shape at locations substantially matching x-axis coordinates of the input on the interface, and a second group of indicators can be provided on the interface along the perimeter of the rectangular shape at locations substantially matching y-axis coordinates of the input on the interface. A display of indicators in the first group of indicators and indicators in the second group of indicators can be configured to fade-in or fade-out as the input on the interface changes. An additional indicator may also be positioned at a location of the input, for example.

In other examples, multiple inputs may be received on the interface over time indicating commands for the orientation of the camera on the robotic device, and multiple indicators may be provided on the interface that each are representative of command. For instance, the interface may be presented on a touchscreen and the user may provide an initial input by contacting the touchscreen using a finger, and then slide the finger across the interface to provide multiple inputs. Indicators may be provided to represent locations of some or all received inputs. One or more indicators may represent a previous location of an input on the interface, and one or more indicators may represent a current location of the input on the interface. Further, one or more indicators may represent a future location of a projected future input on the interface.

In further examples, as the multiple inputs on the interface are received over time, a display of one or more of the indicators that represents the previous location of the input on the interface may fade-out over time. In a similar manner, a display of an indicator that represents the future location of the projected future input on the interface may fade-in over time.

The interface may be configured in other manners as well, and may take the form or other geometric shapes or designs based on applications.

At block 306, the method 300 includes determining that the location of the input on the interface is within a distance threshold to a pre-set location on the interface. For example, a determination is made whether the location of the input is close to a pre-set location. Depending on a configuration or form of the interface, the pre-set location may correspond to the orientation of the camera on the robotic device to be forward, reverse, right, or left and/or may be configured with any pan/tilt values with respect to an orientation of the robotic device.

The pre-set location on the interface may be indicative of one or more of a pan or a tilt value associated with a given orientation of the camera on the robotic device. As examples, the pre-set location on the interface may be associated with commands for an orientation of the camera to capture a view of a base of the robotic device, a forward view of the robotic device, a backward view of the robotic device, a view to a right of the robotic device, a view to a left of the robotic device, an upward view of the robotic device, or a downward view of the robotic device. Pre-set locations may be configured by a user, or may be determined based on a user profile (e.g., pre-set locations can be stored and retrieved per user).

The distance threshold may be any distance and can be set by a user. As an example, the distance threshold may be about equal to a length of the indicator, and a length of the indicator may be adjusted according to a display screen on which the interface is displayed. As one example, the length of the indicator may be about 1 mm to about 10 mm. As another example, in an instance in which the interface is configured in a circular form (e.g., circle, oval, etc.) or has arcs, the distance threshold may be a radial distance of about 5 degrees to about 15 degrees. As another example, the distance threshold may be associated with a linear distance not related to a length of the indicator, and may be about 1 mm to about 15 mm. As still another example, the distance threshold may be a linear distance or a radial distance and may be determined based on a size of a display on which the interface is provided. The distance threshold may thus be adjusted according to a size of the display. The distance threshold may also be a distance related to a percentage of a size of the interface, such as about 1% to about 5% (e.g., the size of the interface may be a circle with a diameter of 3 cm, and the distance threshold may be about 3 mm to about 15 mm).

In some examples, a location of the input may change to a second location on the interface, such as when a user slides a finger across the interface on a touchscreen display. In such an example, it can be determined whether the second location on the interface is within the distance threshold to the pre-set location on the interface. Thus, a device operating the interface may continuously make a determination whether an input is within the distance threshold. Alternatively, the device may make the determination at time intervals, or at times when an input is received, for example.

In further examples, when subsequent inputs are received on the interface a location of the indicator on the interface may be modified to substantially match a location of a subsequent input on the interface.

At block 308, the method 300 includes repositioning the indicator on the interface to be at the pre-set location. For example, the indicator may initially be provided at a location representing the input, and if the input is determined to be within the threshold distance to the pre-set location, the indicator may be repositioned to be at the pre-set location. As a specific example, the pre-set location may correspond to a location on the interface, and the indicator may be repositioned to the location so as to "snap-to" the location when the input is close to the location.

In some examples, the interface may include a number of pre-set locations on the interface, and each pre-set location may be associated with a given orientation of the camera on the robotic device. The location of the input on the interface may be within the distance threshold to one of the number of pre-set locations on the interface, and if so, the indicator can be responsively repositioned on the interface to be at the one of the number of pre-set locations.

The interface may include an icon indicating a pre-set command for a given orientation of the camera on the robotic device. The pre-set command may include adjusting the orientation of the camera to be directed to a predetermined object. In this manner, once the device or the robotic device recognizes the predetermined object in a field of view of the robotic device, the camera may be operated to focus on the predetermined object. In an instance in which the orientation of the camera on the robotic device is associated with geographic position coordinates of a predetermined object, the icon may be displayed on the interface when the robotic device is within a predetermined distance of the geographic position coordinates.

As one example, a "snap-to location" may be associated with a person's face or a specific object. Face-tracking or object tracking may be performed so as to provide on the interface a dynamically changing icon based on recognized faces/objects. The icon may be selected to provide an input indicating to focus the camera on the associated object.

As another example, geographic positions or locations may be stored as a snap-to location that include corresponding pan/tilt control values for the camera on the robotic device. The interface may receive inputs corresponding to a pre-stored location (e.g., real world coordinates), and as the robotic device approaches the location, the camera may be operated to capture images of the pre-stored location.

In further examples, the method 300 may include providing one or more of an audio or vibration indicator that is indicative of repositioning the indicator on the interface to be at the pre-set location. The audio or vibration signal may provide feedback to a user indicating that the change on the interface has been made.

In some examples, the method 300 may further include providing on the interface a display of a region surrounding the pre-set location that is indicative of the distance threshold. A user may then visualize the distance threshold and have information indicating when the snap-to feature may be activated or triggered, for example. The region may be displayed at all times, or may be displayed as inputs on the interface approach the pre-set location.

In still further examples, the method 300 may include providing on the interface text that indicates the command for the orientation of the camera on the robotic device. The text may provide further feedback to the user indicating the command that corresponds to a received input.

The method may be performed by a device to control operation of a robotic device. The device may include a processor and memory including instructions stored therein executable by the processor to perform functions of the method 300. The device may be remote from the robotic device, and may send signals (either via a wired or wireless connection) to the robotic device. Thus, the interface may be provided by or on the device. The device may include a touchscreen display configured to receive the input on the interface (e.g., via a contact with the touchscreen), and based on the input, the device may be configured to generate a control signal for the command for the orientation of the camera on the robotic device. The device may subsequently provide the control signal to the robotic device. The method 300 may be performed to operate any type of robotic device, including robotic devices that may be configured to turn in place or not, that may be stationary or mobile, or that may have other functionality or limitations. The method 300 may further include receiving a double-tap input on an interface, and generating a control signal indicating the orientation of the camera on the robotic device to be reset to a default orientation (e.g., facing forward).

Figure 5A:
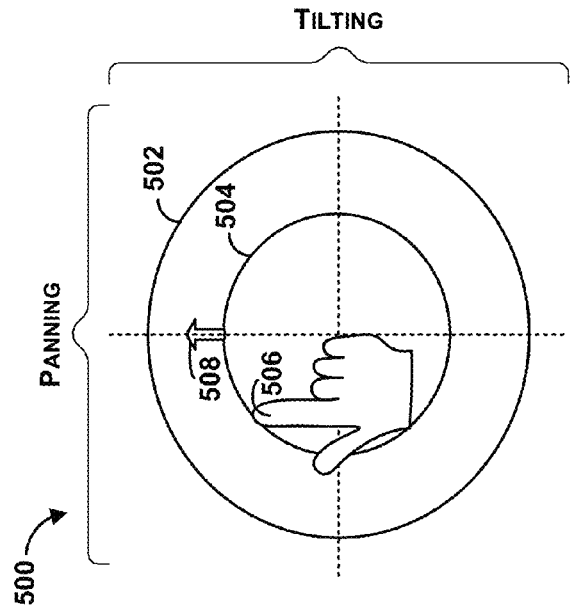
FIGS. 5A-5B are example illustrations of an interface to receive inputs to control orientations of a camera on a robotic device.
Figure 4A:
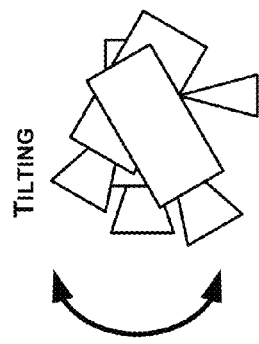
FIGS. 4A-4B are conceptual illustrations of example orientations of a camera on a robotic device.
Figure 5B:
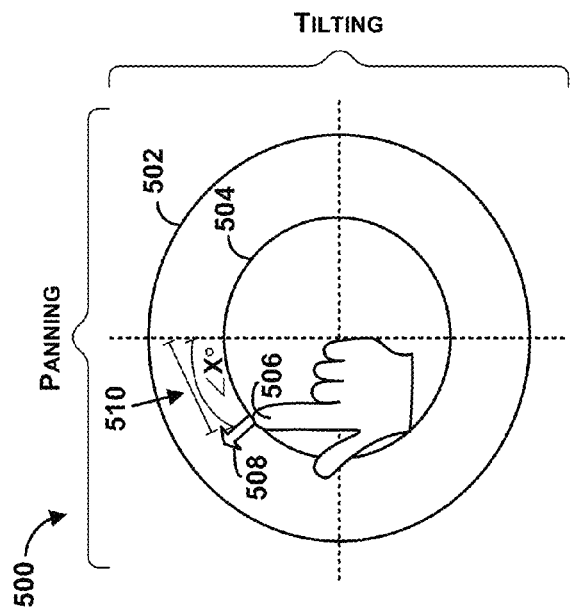
Figure 4B:
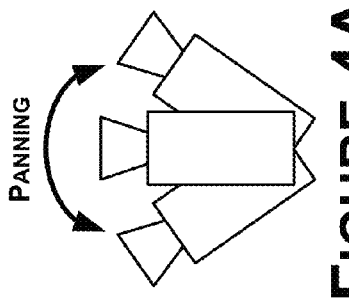

FIGS. 4A-4B are conceptual illustrations of example orientations of a camera on a robotic device, and FIGS. 5A-5B are example illustrations of an interface 500 to receive inputs to control the orientations. In FIG. 4A, a camera may be controlled to move about a pivot point in a horizontal direction so as to pan the camera from left to right. The panning may include horizontal movement or rotation of the camera (e.g., still or video camera), or scanning of a subject horizontally on video or a display device. The camera may be configured to pan in any amount (such as in the range of 0 degrees to 360 degrees). In FIG. 4B, the camera may be controlled to move about a pivot point in a vertical direction so as to tilt the camera up and down. The camera may be configured to tilt in any amount (such as in the range of 0 degrees to 360 degrees. In some examples, panning or tilting of the camera may be performed by maintaining the camera stationary and digitally processing captured images.

FIGS. 5A-5B are example illustrations of an interface 500. The interface 500 may be provided on a display of a device, and may be configured to receive inputs and correlate the inputs to commands for an orientation of the camera on the robotic device that is remote from the device. In some examples, the interface 500 may be provided on a display of a device overlaid on top of other information, such as map data or a video stream of the camera. In one example, the device may receive the video stream of the camera, and provide the interface overlaid on top of the video stream on the display. The video stream may be provided in a background of the display, and the interface 500 may be provided in a foreground of the display.

In some examples, while controlling operation of the camera on the robotic device, it is desirable to precisely select a desired orientation of the camera. The interface 500 may be configured to enable precise selection of a desired orientation of the camera, and may provide tactile feedback to a user. The interface 500 may also lower the need for a user to constantly provide correction commands to correct orientation or oscillating behavior of the camera.

The interface 500 is shown to include two concentric circles 502 and 504 that may be representative of a range of motion of the camera on the robotic device, or a range of orientation of the camera. An input on the interface 500 may be associated with coordinates on an x-y axis, and the x-axis may correspond to values for the panning of the camera and the y-axis may correspond to values for the tilting of the camera.

The interface 500 may receive an input from a user's finger or from a stylus at a location 506. The interface 500 may be configured to provide an indicator 508 at a location representing the location of the received input. As shown in FIG. 5A, the interface 500 may be configured to be provided on a touchscreen, and a user may provide an input at the location 506. The indicator 508 is provided adjacent the location 506 so as to represent the input. In this way, a user may view the indicator 508, rather than providing the indicator exactly at the location 506 in which the indicator 508 would be provided underneath the user's finger. In alternative examples, the indicator 508 may be provided at the location 508 and may be of a size such that a user can view the indicator 508.

The location 506 of the input may be compared to pre-set locations on the interface 500. Example pre-set locations may include locations where the concentric circles 502 and 504 intersect either the x axis or y axis. A distance 510 from the location 506 of the input can be determined and compared to a distance threshold. When the distance 510 is greater than the distance threshold, no action may occur. However, when the distance 510 is less than the distance threshold, the indicator 508 may be repositioned on the interface to be at a pre-set location. FIG. 5B illustrates an example in which the distance 510 is less than the distance threshold to the pre-set location on the y-axis, in which case the indicator 508 is repositioned to the pre-set location.

In examples, using the interface 500, inputs may be received and an auto-snap function may be activated to the major axes when the input is within a delta distance from the major axes. As another example, when the input is between about 80 degrees and 100 degrees, the auto-snap feature may set the orientation to be 90 degrees. The auto-snap feature may be used for any pre-set location on the interface as desired.

Using the interface 500, a camera on a robotic device may be tele-operated to re-center the camera, for example. The interface 500 may be provided on a device, such as a tablet computer or a smartphone, which includes a limited screen display. Precise camera movements can be received on an interface using the example auto-snap function described herein.

Figure 6:
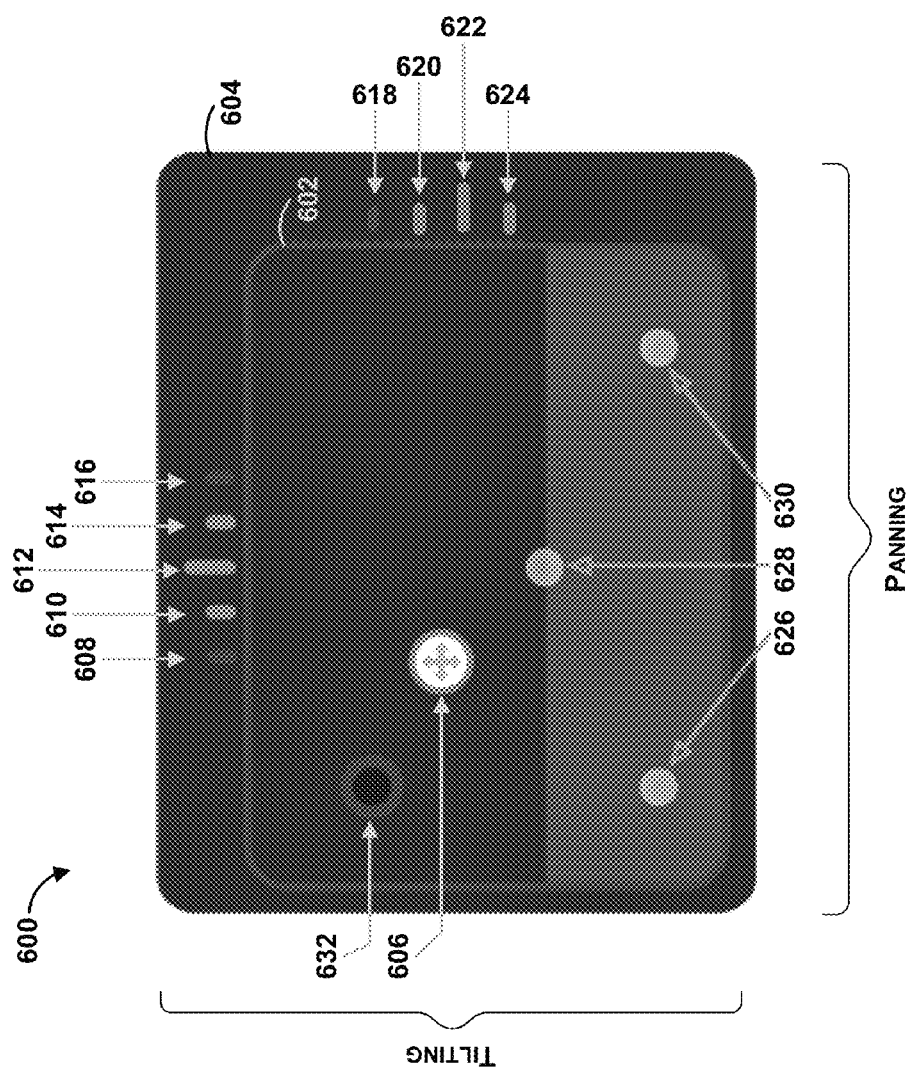
FIG. 6 is another example illustration of an interface.

FIG. 6 is another example interface 600. The interface 600 is shown to be a substantially rectangular shape, and may include as structure two rectangles 602 and 604. The interface 600 may receive an input 606 at any location within the rectangle 602. The input 606 may be associated with pan and tilt values of a camera on a robotic device. The interface 600 may be associated with an x-y axis such that an x-axis coordinate of the input 606 is associated with a pan value, and a y-axis coordinate of the input 606 is associated with a tilt value. The interface 600 may be configured to provide an indicator (shown as a circle enclosing arrows) at a location of the input 606.

The interface 600 may be further configured to provide additional indicators that are representative of a location of the input. As shown, indicators 608, 610, 612, 614, and 616 may be provided along a perimeter of the rectangle 602 at x-axis coordinates that substantially match an x-axis coordinate of the location of the input 606. Similarly, the indicators 618, 620, 622, and 624 may be provided along a perimeter of the rectangle 602 at y-axis coordinates that substantially match an x-axis coordinate of the location of the input 606. The groups of indicators along the x-axis and y-axis perimeter of the rectangle 602 may be provided when inputs are received on the interface 600, for example.

The interface 600 is further configured to include pre-set locations 626, 628, and 630. Each of the pre-set locations 626, 628, and 630 may correspond to pre-set pan/tilt values of the camera on the robotic device. In examples, when the input 606 comes close to any of the pre-set locations 626, 628, or 630, the auto-snap feature is triggered and the indicator for the input 606 is repositioned to be at the pre-set location. This may be useful, for example, in an instance in which the interface 600 is provided on a device with a small screen size, and precise inputs may be difficult to provide to the interface 600.

The interface 600 may further provide an indicator 632 that represents current pan/tilt values of the camera on the robotic device to provide feedback to the user. A position of the indicator 632 on the interface 600 may be adjusted as inputs are received due to movement of the camera, for example.

Figure 7A:
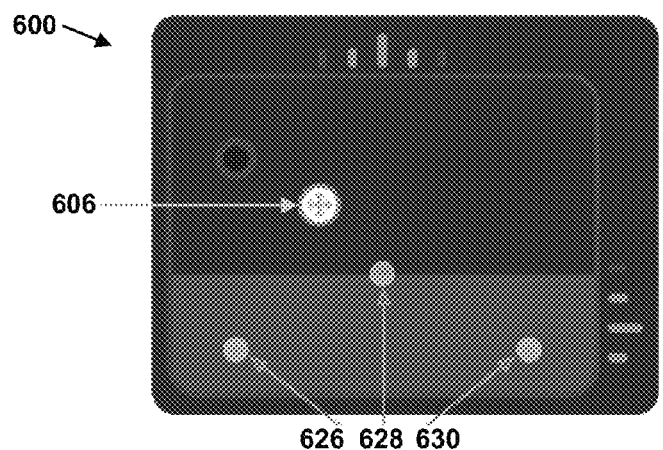
FIGS. 7A-7C illustrate example configurations of the interface of FIG. 6.
Figure 7B:
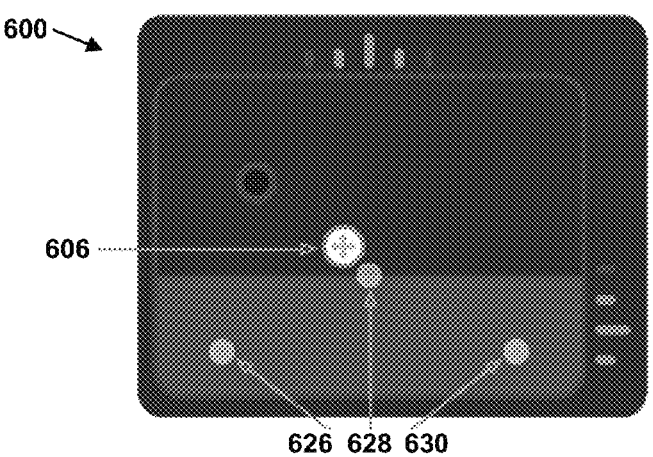
Figure 7C:
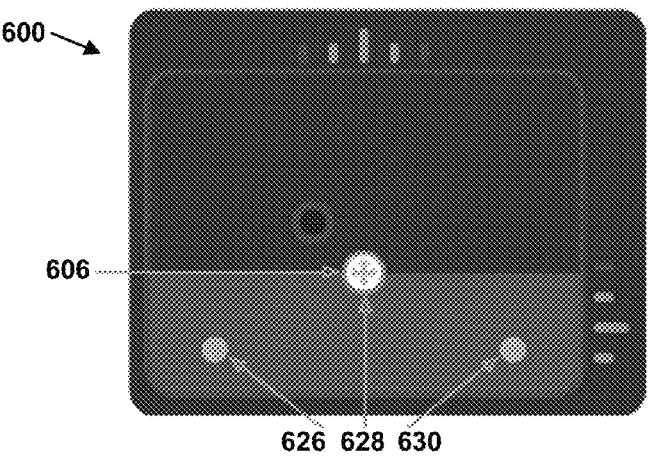

FIGS. 7A-7C illustrate example configurations of the interface 600. FIG. 7A generally represents the interface 600 as shown in FIG. 6, in which the input 606 is provided at a distance from the pre-set locations 626, 628, and 630 that is greater than the distance threshold. In FIG. 7B, the input 606 has changed and is closer to the pre-set location 628. In this example, a distance from the input 606 in FIG. 7B to the pre-set location 628 may be less than the distance threshold. Thus, as shown in FIG. 7C, the input 606 can be repositioned (e.g., auto-snapped) to the pre-set location 628.

In examples herein, interfaces are provided that may be configured to both receive inputs as well as provide outputs (e.g., touchscreen displays). For instance, an interface may be provided on a handheld computer that can receive an input and provide a display representative of the output.

In other examples, interfaces may be provided that are configured to receive inputs, and outputs may be provided by other devices. For instance, a motion-detection device may be configured to receive an input and to provide the input to a display device which displays an output representative of the input. The motion-detection device may include a camera, a depth sensor, microphones, etc., and may be configured to provide motion capture, facial recognition, and voice recognition capabilities. The depth sensor may be configured to include an infrared laser projector and a monochrome CMOS sensor that can capture video data in 3D under ambient light conditions. The motion-detection device may be configured to provide an interface using the infrared laser projector, for example, to receive inputs from users. The inputs can be associated with indicating a command for an orientation of a camera on a robotic device that is remote from the motion-detection device. The interface may be viewable by a user, such as a laser projected interface, or may be a conceptual interface in which inputs are received due to motion of the user and the interface is not visible to the user.

The motion-detection device may be coupled to a display device, and may provide outputs to the display device. The motion-detection device may generate a display representative of the interface or representative of inputs to the interface, and provide the display to the display device (or may provide information associated with the inputs to the display device and the display device can generate the display). The display may include an indicator representing a location of a received input, and the indicator may be representative of the command for the orientation of the camera on the robotic device. The location of the received input can be associated with a physical or geographic location, or can be associated with a location on the display representative of the interface that maps to the location of the received input. For instance, a user may provide an input to the interface provided by the motion-detection device at a physical location, and the physical location can be mapped to a position on a display representative of the interface.

The motion-detection device or the display device may further be configured to determine that the location of the input at the interface is within a distance threshold to a pre-set location associated with the interface. For example, a pre-set location associated with the interface provided by the motion-detection device may be a physical or geographic location in an area. The physical or geographic location in the area can be mapped to a location on the display representative of the interface that corresponds to a pre-set configuration of the orientation of the camera on the robotic device, as described herein.

The motion-detection device or the display device may be further configured to generate (or provide) a display of the indicator on the display representative of the interface repositioned to be at a location representing (or associated with) the pre-set location.

Thus, in some examples, a first device may be configured to receive an input at an interface that may be provided by or on the first device, and a second device different from the first device may be configured to provide an output based on the input. As a specific example, a motion-detection device may receive an input, and an output can be provided on a display device coupled (either wired or wirelessly) to the motion-detection device. As another example, a user may provide an input on a device (e.g., a keyboard, mobile phone, computing device, etc.) that is coupled to a separate device (e.g., a display) on which an output is provided.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A method comprising:
    providing an interface for controlling movement of a camera on a robotic device;
    receiving from the robotic device data indicative of an environment of the robotic device;
    determining, by a computing device and based on the data indicative of the environment of the robotic device, a pre-set command associated with adjusting an orientation of the camera on the robotic device;
    providing, by the computing device and on the interface, an icon indicative of the pre-set command associated with adjusting the orientation of the camera on the robotic device; and
    generating a control signal indicating the pre-set command in response to receiving an input at a location on the interface that is within a threshold distance of a location of the icon.

2. The method of claim 1, wherein determining the pre-set command associated with adjusting the orientation of the camera on the robotic device comprises recognizing a predetermined object in the environment.

3. The method of claim 2, wherein the pre-set command includes adjusting the orientation of the camera on the robotic device to be directed to a position of the predetermined object.

4. The method of claim 3, wherein the position of the predetermined object comprises a dynamically changing position.

5. The method of claim 4, wherein the icon indicative of the pre-set command comprises a dynamically changing icon.

6. The method of claim 1, wherein determining the pre-set command associated with adjusting the orientation of the robotic device comprises determining that a location of the robotic device is within a predetermined distance of a pre-stored geographic location, wherein the pre-stored geographic location is one of a plurality of pre-stored geographic locations.

7. The method of claim 6, wherein the pre-set command includes adjusting the orientation of the camera on the robotic device to be directed to the pre-stored geographic location.

8. The method of claim 1, wherein the interface is provided on a display of the computing device and the method further comprises overlaying on the display a video stream of the camera on the robotic device.

9. The method of claim 1, further comprising providing the control signal to the robotic device.

10. The method of claim 1, wherein the pre-set command is further determined based on a user profile.

11. The method of claim 1, wherein receiving the input at the location on the interface comprises receiving a contact on a touchscreen.

12. The method of claim 1, further comprising providing on the interface a display of a region substantially adjacent or surrounding the location of the icon, wherein the region is indicative of the threshold distance.

13. The method of claim 1, further comprising providing one or more of an audio or vibration indicator that is indicative that the input is within the threshold distance of the location of the icon.

14. The method of claim 1, further comprising:
    receiving a reset input via the interface; and
    responsively generating a control signal indicating a command for resetting the orientation of the camera to a default orientation.

15. A device comprising:
    at least one processor; and
    memory including instructions executable by the at least one processor to cause the device to perform functions comprising:
        providing an interface for controlling movement of a camera on a robotic device,
        receiving, from the robotic device, data indicative of an environment of the robotic device,
        determining, based on the data indicative of the environment of the robotic device, a pre-set command associated with adjusting an orientation of the camera on the robotic device,
        providing, on the interface, an icon indicative of the pre-set command associated with adjusting the orientation of the camera on the robotic device, and
        generating a control signal indicating the pre-set command in response to receiving an input at a location on the interface that is within a threshold distance of a location of the icon.

16. The device of claim 15, wherein determining the pre-set command associated with adjusting the orientation of the camera on the robotic device comprises recognizing a predetermined object in the environment.

17. The device of claim 16, wherein a position of the predetermined object is dynamically changing.

18. The device of claim 15, wherein determining the pre-set command associated with adjusting the orientation of the camera on the robotic device comprises determining that a location of the robotic device is within a predetermined distance of one of a plurality of pre-stored geographic locations.

19. The device of claim 15, wherein the interface is provided on a display of the device, and wherein the functions further comprise providing, on the display of the device, image data received from the camera on the robotic device.

* * * * *